UNITED STATES PATENT OFFICE.

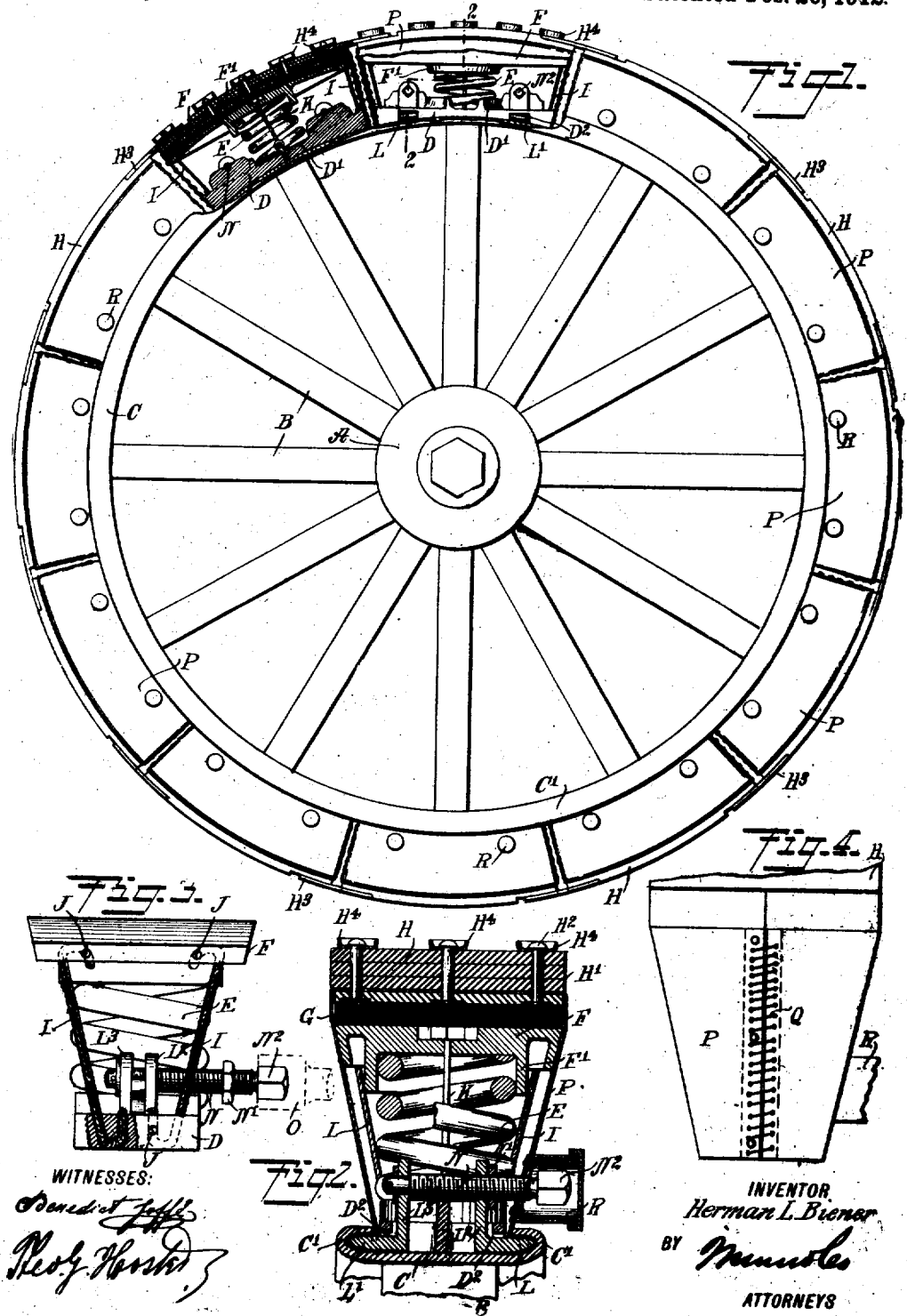

HERMAN LEO BIENER, OF NEW YORK, N. Y., ASSIGNOR, BY DIRECT AND MESNE ASSIGNMENTS, TO AUTO SECTIONAL LEATHER TIRE COMPANY, OF NEW YORK, N. Y., A CORPORATION OF NEW YORK.

WHEEL-TIRE.

1,018,292.  Specification of Letters Patent.  Patented Feb. 20, 1912.

Application filed July 14, 1910. Serial No. 571,945.

*To all whom it may concern:*

Be it known that I, HERMAN L. BIENER, a subject of the Emperor of Austria-Hungary, and a resident of the city of New York, borough of Manhattan, in the county and State of New York, have invented a new and Improved Wheel-Tire, of which the following is a full, clear, and exact description.

The object of the invention is to provide a new and improved wheel tire for the wheels of automobiles and other motor vehicles, and which is puncture proof and of the desired elasticity, easily applied to or removed from the wheel rim, and made in sections, any one of which can be detached from the wheel rim whenever desired for repairing or other purposes, without disturbing the other sections.

For the purpose mentioned the tire is made in independent sections, removably attached to the wheel rim, and each consisting of a rim plate, a tread plate, a spring interposed between the rim plate and the tread plate at the middle thereof, and flexible inelastic connections between the ends of the tread plate and the rim plate.

A practical embodiment of the invention is represented in the accompanying drawings forming a part of this specification, in which similar characters of reference indicate corresponding parts in all the views.

Figure 1 is a side elevation of a wheel provided with the improved tire, parts being shown in section; Fig. 2 is an enlarged transverse section of the same on the line 2—2 of Fig. 1; Fig. 3 is an end view of a tire section with the cover and tread removed and part of the rim plate shown in section; and Fig. 4 is an end view of one of the sections.

The hub A of the wheel is provided with the usual spokes B and the rim C, having upwardly and inwardly extending side flanges C', as plainly indicated in Fig. 2. On the rim C of the wheel is arranged the wheel tire made in sections, alike in construction, and each having a rim plate D seated on the peripheral face of the rim C and provided at its middle with a seat D' for the reception of the inner end of a coil spring E, seated at its outer end in a seat F' formed on the inner face of a tread plate F, onto the peripheral face of which fits a cushioning plate G of rubber or other elastic material. On the said cushioning plate G rests the tread H, preferably made of layers H' of leather, fastened together by rivets H², as indicated in Fig. 2. The ends of the rim plate D and the tread plate F are connected with each other by pairs of cables I, fastened in place at the said ends by screws J, as plainly indicated in Fig. 3. By the arrangement described, the tread plate F, cushioning plate G and the tread H are yieldingly supported at the middle by the spring E from the rim plate D, and the ends of the tread plate F, cushioning plate G and tread H are able to yield owing to the flexible connection by the cables I with the rim plate D. A cable connection K is also made centrally through the spring E between the rim plate D and the tread plate F.

In order to removably fasten a tire section in position on the rim C, use is made of pairs of lugs L, L' mounted to slide transversely in suitable guideways D² formed on the rim plate D, as plainly shown in Figs. 1 and 2, and the said lugs L, L' are adapted to pass with their outer ends into engagement with the side flanges C', to hold the section and tire in position on the rim C (see Fig. 2). Each pair of lugs L, L' is provided with outwardly-extending flanges L², L³, and a transverse screw rod N screws in the flange L² and is mounted to turn in the flange L³, so that when the screw rod N is turned in one direction the lugs L, L' can move outward into engagement with the flanges C', and when the screw rod N is turned in the opposite direction, the lugs L, L' are moved toward each other and out of engagement with the flanges C'. A lock nut N' screws on each screw rod N and is adapted to abut against the flange L² at the time the lugs L, L' are in their outward locking position, as shown in Fig. 2. Each screw rod N is provided with a polygonal head N² for engagement by a wrench O or other tool, to permit of conveniently turning the screw rod N for moving the lugs L, L' in or out of engagement with the flanges C' of the rim C.

A cover P of leather or other similar suitable material is fastened to the tread H, by passing the middle portion of the cover P between adjacent layers H' of the tread H, as indicated in Fig. 2. The sides of the cover P have their lower edges clamped in position between the lugs L, L' and the rim flanges C', so as to hold the tread H in position on the cushioning plate G and to hold the latter in position on the tread plate F. The ends of the cover P are fastened together by a suitable lacing Q, as indicated in Fig. 4, and one of the sides of the cover P is provided with caps R, into which project the heads N² of the screw rods N. By unscrewing a cap, ready access is had to the head N² of the screw rod, to permit the application of the wrench O or other tool, as previously explained.

In order to cover the joints at the peripheral faces of adjacent tire sections, use is made of a plate or layer H³ secured to and extending from the tread of one section across the joint into a recess on the tread of the next section, as plainly indicated in Fig. 1. The rivets H² of the treads H and plate H³ may be provided with suction cups H⁴ to insure a firm grip of the tread H on the roadway.

From the foregoing it will be seen that the sections of the wheel tire are wholly independent one of the other, and are removably secured to the rim C of the wheel, and each section has its tread yieldingly supported so as to properly cushion the wheel, thus insuring easy riding of the persons in the automobile or other motor vehicle.

It will also be noticed that each section of the wheel tire can be quickly removed whenever desired, for repairs or other purposes, and each tire is composed of comparatively few parts, not liable easily to get out of order.

Having thus described my invention, I claim as new and desire to secure by Letters Patent:

1. A wheel tire made in sections arranged around the rim of the wheel, each section comprising a rim plate, a tread plate, a coil spring interposed between the said rim plate and the said tread plate at the middle thereof, a flexible inelastic connection between the rim and tread plates at the center of the plates, said connection extending through the spring, flexible inelastic connections between the ends of the said rim plate and tread plate, and means carried by the rim plate for detachably securing the section to the rim of a wheel.

2. A wheel tire made in sections arranged around the rim of the wheel, each section comprising a rim plate, provided with transverse guideways, a tread plate, resilient means interposed between the said rim plate and the said tread plate, pairs of fastening lugs mounted to slide in the guideways of the said rim plate and having outwardly extending flanges, and transversely extending screw rods each mounted to turn in one of the flanges and screwing in the other flange of a pair of lugs to move the latter into or out of engagement with the wheel rim flanges.

3. The combination with a wheel rim having inwardly extending side flanges, of a tire made in sections, arranged around the rim of the wheel, each section comprising a rim plate, a tread plate, resilient means interposed between the said rim plate and the said tread plate, pairs of fastening lugs mounted to slide transversely on the said rim plate for engaging and disengaging the wheel rim flanges, a screw rod engaging each pair of fastening lugs to move the latter transversely in and out of engagement with the wheel rim, a tread and a cover attached to the said tread and extending over the sides and ends of the section, and clamped between the said fastening lugs and the wheel rim flange.

4. A wheel tire made in sections, each section consisting of a rim plate, a tread plate, a coiled spring interposed between the said plates at the center of length thereof, flexible inelastic connections between the ends of the said plates, a cushion on the tread plate, a tread on the cushion, a cover for the section secured at its center to the tread, and means carried by the rim plate for engaging the rim of a wheel to detachably secure the section and its cover to said rim.

In testimony whereof I have signed my name to this specification in the presence of two subscribing witnesses.

HERMAN LEO BIENER.

Witnesses:
 THEO. G. HOSTER,
 PHILIP D. ROLLHAUS.